A. BRÄUTIGAM.
METHOD OF DISINTEGRATING AND REMOVING ANNULAR SALAMANDERS IN NODULIZING KILNS.
APPLICATION FILED NOV. 26, 1909.
Reissued Dec. 28, 1909.
13,062.
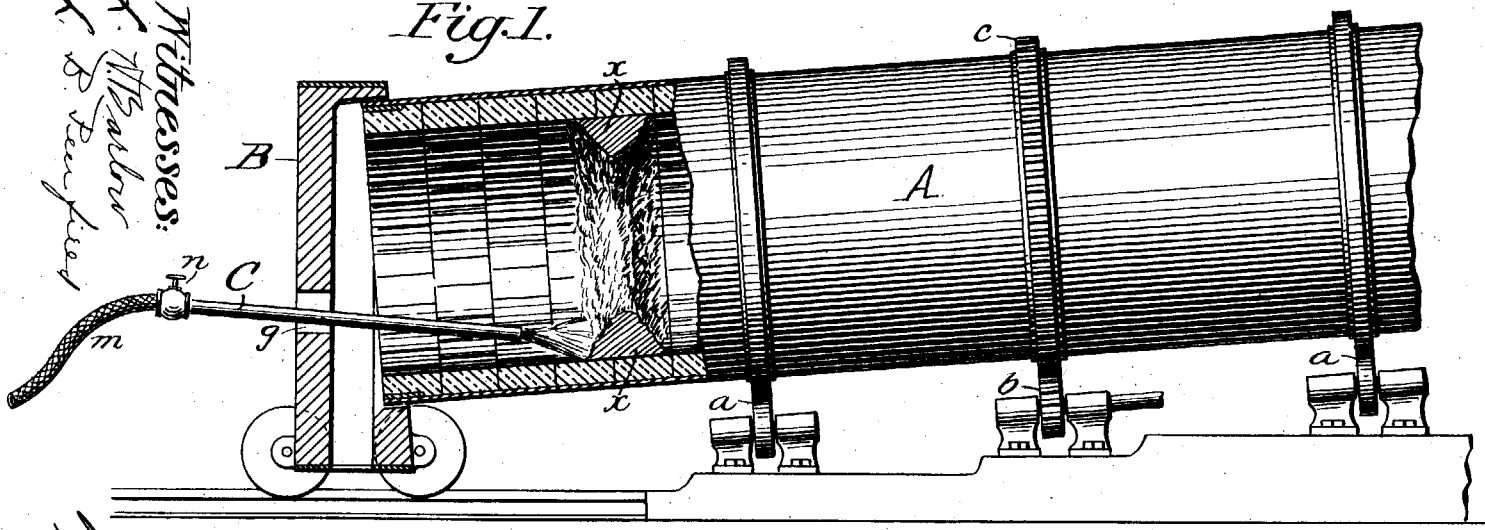
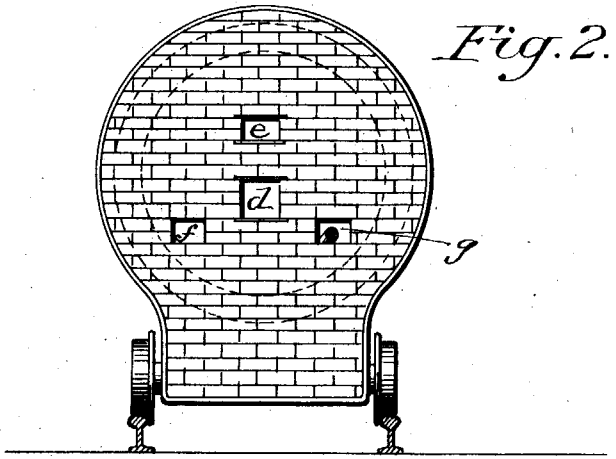
Witnesses:
L. N. Barlow
L. B. Penfield
Inventor:
August Bräutigam,
by Fennie & Goldsborough,
Attorneys.

UNITED STATES PATENT OFFICE.

AUGUST BRÄUTIGAM, OF SOUTH ORANGE, NEW JERSEY, ASSIGNOR TO AUGUST HECKSCHER, OF NEW YORK, N. Y.

METHOD OF DISINTEGRATING AND REMOVING ANNULAR SALAMANDERS IN NODULIZING-KILNS.

13,062. Specification of Reissued Letters Patent. Reissued Dec. 28, 1909.

Original No. 936,981, dated October 12, 1909, Serial No. 506,654. Application for reissue filed November 26, 1909. Serial No. 530,253.

*To all whom it may concern:*

Be it known that I, AUGUST BRÄUTIGAM, a German subject, residing at South Orange, county of Essex, and State of New Jersey, have invented certain new and useful Improvements in the Method of Disintegrating and Removing Annular Salamanders in Nodulizing-Kilns; and I do hereby declare the following to be a full, clear, and exact description of the invention, such as will enable others skilled in the art to which it appertains to make and use the same.

In the nodulizing and desulfurizing of fine iron ores, flue dust, spent pyrites, and like materials in inclined cylindrical rotary kilns, it is found that an annular or ring-like salamander tends to form at a zone varying say from 4 to 8 feet from the lower end of the kiln, and that this salamander will increase by degrees so as to seriously obstruct and finally altogether interrupt the progress of the material to the lower end of discharge. Accordingly it has been customary, in such cases, to stop the rotation of the kiln and to break down the accumulation by mechanical means assisted by water cooling after the interior of the kiln had cooled off sufficiently for the purpose. This operation is exacting upon the energies and endurance of the workmen, and is attended with a considerable loss of time and of fuel. Moreover, it subjects the shell of the kiln to serious contraction attended with loosening of the tires or bands upon which it rests and in addition to the usual damage incident to the use of water for cooling, the kiln, after the operation, has to be rekindled and fired to the proper heat before it will again nodulize.

By the present invention, I substitute for the practice referred to, a mode of operation having as its characteristic feature the employment of a jet of compressed air directed against the annular or ring-shaped salamander as soon as it has formed to a sufficient degree to be objectionable. The effect of the air jet (preferably directed against the base of the ring) is apparently to suddenly chill the almost white-hot ring causing it to contract and crack and to shrink away from the brick lining of the kiln. In a short time, the air will find its way through the cracks and crevices to such an extent that, when the rotation of the kiln is resumed, a portion of the ring will become detached and fall down, whereupon the remainder, deprived of the "key-stone" support of the detached portion, will collapse and crumble into fragments.

In the accompanying drawing, Figure 1 represents, partly in section and partly in side elevation the lower portion of a rotary nodulizing kiln and illustrates the mode of carrying out my invention therein. Fig. 2 represents an end view of the furnace hood.

Similar letters of reference indicate similar parts in both views.

Referring to the drawing, A indicates a nodulizing kiln of the ordinary construction, adapted to be supported upon friction rollers *a* in the usual way and to be rotated in any suitable manner, as, for instance, by the power-driven pinion *b* and the toothed band *c*.

B indicates the customary hood, with its aperture *d* for the admission of the fuel-injecting burner, and *e*, *f*, *g* indicate supplemental apertures, which may be temporarily closed or bricked up, if desired, during the usual run of the furnace, but any of which may be uncovered, so as to serve as sight openings, or for the introduction of the jet-tube C. The jet-tube C may conveniently form a continuation of the hose *m* and is provided with a regulating valve *n*.

I have indicated generally at *x* the usual place of formation of the annular or ring-like salamander, although it will be understood that its location will vary with different kilns and with different kiln conditions. As soon as it has become or tends to become sufficiently obstructive to make its removal desirable, I insert the jet-tube C through one of the uncovered openings referred to, and admit a jet of compressed air (at a pressure of say 15 to 30 pounds) which thereupon impinges against the ring-like salamander, preferably at the base thereof. It is found that the place against which the jet strikes becomes promptly reduced in temperature, having an immediate blackened appearance as viewed through the sight openings. This produces apparently a contraction of the substance of the ring, and cracks and fissures develop in it, with the resultant effect that in a short time the air finds its way through the cracks and fissures to such an extent that the ring begins to crumble and when the kiln again starts to revolve portions of the ring drop off. Usually, a section gives way and disintegrates in such manner as to suddenly remove the support of the entire ring, so that it collapses as a whole, in manner similar to the fall of an arch whose keystone is removed. The disintegrated ring or salamander becomes broken up into fragments which join the main body portion of the sintered ore passing through the kiln and may, if suitable, form a part of its product.

I preferably stop the rotation of the kiln during the application of the air jet, so as to concentrate the jet upon a single portion of the ring, *i. e.*, its lowermost portion, but this, though desirable, is not absolutely necessary, as the jet may, in some instances, be applied simultaneously with the kiln's revolution, or when the speed of revolution is either diminished or increased.

What I claim is:

1. The method of disintegrating annular salamanders in rotary nodulizing kilns, which consists in directing against the salamander while in the highly heated state a jet of compressed air; substantially as described.

2. The method of disintegrating and removing annular salamanders in rotary nodulizing kilns, which consists in directing against the salamander while in the highly heated state a jet of compressed air and rotating the furnace until the annulus is broken down; substantially as described.

3. The method of disintegrating and removing annular salamanders in rotary nodulizing kilns, which consists in stopping the rotation of the kiln and directing against the lower portion of the salamander while in the highly heated state a jet of compressed air, and resuming the rotation of the furnace until the annulus is broken down; substantially as described.

In testimony whereof I affix my signature, in presence of two witnesses.

AUGUST BRÄUTIGAM.

Witnesses:
C. A. JAQUA,
J. P. COUGHLAN.